United States Patent
Kikuchi et al.

(10) Patent No.: US 12,281,235 B2
(45) Date of Patent: *Apr. 22, 2025

(54) PHOTOCURABLE COMPOSITION, INKJET INK COMPOSITION, ACTIVE ENERGY RAY-CURABLE INK COMPOSITION, CURED PRODUCT, AND ELECTRONIC COMPONENT

(71) Applicant: JNC CORPORATION, Tokyo (JP)

(72) Inventors: Ayako Kikuchi, Chiba (JP); Shungo Kojima, Chiba (JP); Kohsuke Yoshitomi, Chiba (JP); Yuka Takahashi, Chiba (JP); Katsuyuki Sugihara, Chiba (JP)

(73) Assignee: JNC CORPORATION, Tokyo (JP)

( * ) Notice: Subject to any disclaimer, the term of this patent is extended or adjusted under 35 U.S.C. 154(b) by 385 days.

This patent is subject to a terminal disclaimer.

(21) Appl. No.: 17/797,106

(22) PCT Filed: Mar. 9, 2021

(86) PCT No.: PCT/JP2021/009263
§ 371 (c)(1),
(2) Date: Aug. 2, 2022

(87) PCT Pub. No.: WO2021/182464
PCT Pub. Date: Sep. 16, 2021

(65) Prior Publication Data
US 2023/0108173 A1    Apr. 6, 2023

(30) Foreign Application Priority Data
Mar. 10, 2020  (JP) .................. 2020-041106

(51) Int. Cl.
*C09D 133/10*   (2006.01)
*B41J 2/01*    (2006.01)
(Continued)

(52) U.S. Cl.
CPC .............. *C09D 133/10* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS 6,127,462 A * 10/2000 Chen .................. C09D 133/064
                                                524/506
8,703,892 B2 * 4/2014 Kodama .............. C09D 133/10
                                                428/64.2
(Continued)

FOREIGN PATENT DOCUMENTS

CN      110582546    12/2019
EP       2738226     6/2014
(Continued)

OTHER PUBLICATIONS

Office Action of China Counterpart Application, with English translation thereof, issued on Dec. 21, 2023, pp. 1-16.
(Continued)

*Primary Examiner* — Manish S Shah
(74) *Attorney, Agent, or Firm* — JCIPRNET

(57) ABSTRACT

A photocurable composition is capable of forming a cured product having good adhesiveness to an inorganic base material and having good ion migration resistance. The photocurable composition includes a monofunctional acrylic monomer (A) in an amount of 40 to 80 wt % relative to 100 wt % of the composition, a polyfunctional acrylic monomer (B) in an amount of 10 to 50 wt % relative to 100 wt % of the composition, and a hydroxyl value adjusting agent (C) in an amount of 0.1 to 30 wt % relative to 100 wt % of the composition, wherein the hydroxyl value of the composition is 1 to 100 mgKOH/g.

16 Claims, No Drawings

(51) Int. Cl.
*B41J 2/21* (2006.01)
*C09D 11/101* (2014.01)
*C09D 11/30* (2014.01)
*C09D 11/38* (2014.01)

(52) U.S. Cl.
CPC ............ *C09D 11/101* (2013.01); *C09D 11/30* (2013.01); *C09D 11/38* (2013.01)

(56) References Cited

U.S. PATENT DOCUMENTS

2008/0008966 A1* 1/2008 Hayata ................. C09D 11/101
427/457
2017/0008325 A1* 1/2017 Hiraoka ............... C09D 11/324

FOREIGN PATENT DOCUMENTS

| EP | 2738226 A1 * | 6/2014 | ......... B41M 7/0045 |
| JP | 2017019989 | 1/2017 | |
| JP | 2017122199 | 7/2017 | |
| WO | 2013015125 | 1/2013 | |
| WO | 2015080155 | 6/2015 | |

OTHER PUBLICATIONS

"International Search Report (Form PCT/ISA/210) of PCT/JP2021/009263," mailed on Apr. 20, 2021, with English translation thereof, pp. 1-4.

* cited by examiner

PHOTOCURABLE COMPOSITION, INKJET INK COMPOSITION, ACTIVE ENERGY RAY-CURABLE INK COMPOSITION, CURED PRODUCT, AND ELECTRONIC COMPONENT

CROSS-REFERENCE TO RELATED APPLICATION

This application is a 371 application of the International PCT application serial no. PCT/JP2021/009263, filed on Mar. 9, 2021, which claims priority benefits of Japanese Patent Application No. 2020-041106, filed on Mar. 10, 2020. The entirety of each of the above-mentioned patent applications is hereby incorporated by reference herein and made a part of this specification.

FIELD OF THE INVENTION

This invention relates to a photocurable composition suitably used for manufacturing a display element or an electronic circuit board such as a printed wiring board, a flexible wiring board, a semiconductor package substrate and a solar cell substrate.

DESCRIPTION OF RELATED ART

In the prior art, various studies have been conducted to coating agents for forming a film on the surface of a base material such as various resin plates, glass plates and metal plates used in the fields of building materials and electricity/electronics to protect the base material from scratches and contamination. Though thermosetting resins and photocurable resins have been used as coating agents, photocurable resins are often used to protect the surfaces of organic base materials because in cases of using them, cured products with high surface hardness are often obtained and the curing is instant by light irradiation to achieve high productivity. However, a cured product using a photocurable resin generally does not have sufficient adhesiveness to an inorganic base material. Therefore, various studies have been made to improve the adhesiveness to inorganic base materials.

For example, Patent Literature 1 describes a photocurable inkjet ink that contains a specific monofunctional polymerizable monomer component (A), a polyfunctional polymerizable monomer (B) and a polymerization initiator (C) in respective predetermined amounts. By using the photocurable inkjet ink, a cured product having good adhesiveness to an inorganic base material can be formed.

CITATION LIST

Patent Literature

Patent Literature 1: Gazette of International Publication WO 2013/015125

SUMMARY OF THE INVENTION

Technical Problem

However, with the thinning and miniaturization of electronic components, there have been cases where the cured film using the photocurable inkjet ink described in Patent Literature 1 is not sufficient. For example, it was found that when a cured film with a thickness of about 10 μm for insulating an EMI shield from a metal wiring is formed using the photocurable inkjet ink of Patent Literature 1, ion migration occurs during the reliability test. Here, ion migration is a phenomenon in which a metal used as a wiring or an electrode is ionized, moves and grows, and causes a short circuit of electronic components. Therefore, preventing ion migration is important from the viewpoint of reliability of electronic components.

An issue of this invention is to provide a photocurable composition capable of forming a cured product having good adhesiveness to an inorganic base material and having a good ion migration resistance.

Solution to Problem

As a result of studies to solve the above problems, the inventors have found that a composition capable of forming a cured product having good adhesiveness to an inorganic base material and good ion migration resistance can be obtained by combining specific components. This invention is based on the finding and has the following configurations.

[1] is a photocurable composition comprising: a monofunctional acrylic monomer (A) in an amount of 40 to 80 wt % relative to 100 wt % of the composition, a polyfunctional acrylic monomer (B) in an amount of 10 to 50 wt % relative to 100 wt % of the composition, and a hydroxyl value adjusting agent (C) in an amount of 0.1 to 30 wt % relative to 100 wt % of the composition, wherein the hydroxyl value of the composition is 1 to 100 mgKOH/g.

[2] is the photocurable composition of [1] in which the hydroxyl value adjusting agent (C) has a hydroxyl value of 100 to 300 mgKOH/g and a weight average molecular weight of 100 to 5000.

[3] is the photocurable composition of [1] in which the hydroxyl value adjusting agent (C) has a hydroxyl value of 150 to 250 mgKOH/g and a weight average molecular weight of 100 to 5000.

[4] is the photocurable composition of [2] or [3] in which the hydroxyl value adjusting agent (C) comprises an acrylic oligomer or a hydroxyl-having (meth)acrylic monomer.

[5] is the photocurable composition of [1] in which the monofunctional acrylic monomer (A) comprises a (meth)acrylate having one or more groups of the group consisting of fused-ring hydrocarbon groups, polycyclic hydrocarbon groups and monocyclic hydrocarbon groups.

[6] is the photocurable composition of [5] in which the monofunctional acrylic monomer (A) is a monofunctional acrylic monomer represented by formula (1):

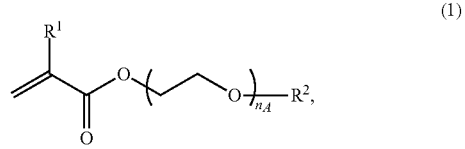

wherein in formula (1), $R^1$ is hydrogen or methyl, $R^2$ is a monovalent organic group with 4 to 30 carbon atoms having a fused-ring hydrocarbon group, a polycyclic hydrocarbon group or a monocyclic hydrocarbon group, and $n_A$ is an integer from 0 to 10.

[7] is the photocurable composition of [6] in which $R^2$ in formula (1) is a group represented by any one of formulae (2) to (5):

(2)

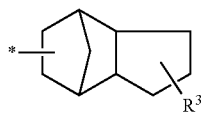

(3)

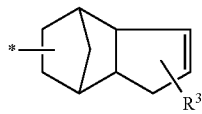

(4)

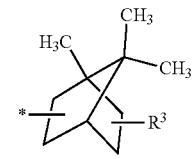

(5)

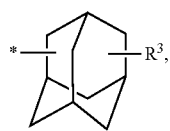

wherein in formulae (2) to (5), each $R^3$ is independently hydrogen or an alkyl having 1 to 6 carbon atoms, and * represents a bond.

[8] is the photocurable composition of [7] in which the polyfunctional acrylic monomer (B) is a bifunctional acrylic monomer represented by formula (6):

(6)

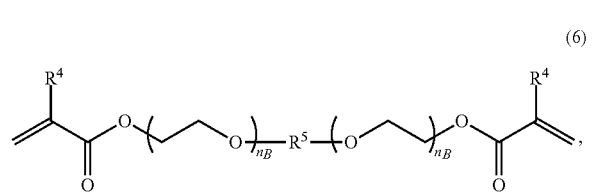

wherein in formula (6), each $R^4$ is independently hydrogen or methyl, $R^5$ is a divalent organic group with 4 to 30 carbon atoms having a fused-ring hydrocarbon group, a polycyclic hydrocarbon group or a monocyclic hydrocarbon group, and each $n_B$ is independently an integer from 0 to 10.

[9] is the photocurable composition of [8] in which $R^5$ in formula (6) is a group represented by any one of formulae (7) to (10):

(7)

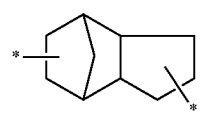

(8)

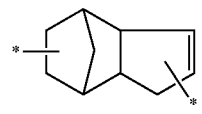

(9)

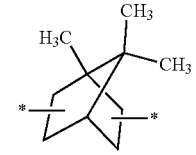

(10)

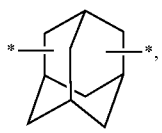

wherein in formulae (7) to (10), * represents a bond.

[10] is the photocurable composition of any one of [1] to [9] which further comprises a photopolymerization initiator (D) in an amount of 5 to 15 wt % relative to 100 wt % of the composition.

[11] is the photocurable composition of any one of [1] to [10] which has a viscosity of 1 to 100 mPa·s at 25° C.

[12] is the photocurable composition of any one of [1] to [11] which has a hydroxyl value of 5 to 40 mgKOH/g.

[13] is an inkjet ink composition comprising the photocurable composition of any one of [1] to [12].

[14] is an active energy ray-curable ink composition comprising the inkjet ink composition of [13].

[15] is a cured product obtained by photocuring the photocurable composition of any one of [1] to [12].

[16] is a cured product obtained by photocuring and then thermocuring the photocurable composition of any one of [1] to [12].

[17] is an electronic component comprising the cured product of [15] or [16].

Advantageous Effects of Invention

The photocurable composition of this invention is obtained by adjusting the hydroxyl value of a composition containing a monofunctional acrylic monomer (A) and a polyfunctional acrylic monomer (B) to 1 to 100 mgKOH using a hydroxyl value adjusting agent (C). Hence, a cured product formed from the photocurable composition has good ion migration resistance.

DESCRIPTION OF EMBODIMENTS

The photocurable composition of this invention (also referred to as "composition" hereinafter) contains a monofunctional acrylic monomer (A), a polyfunctional acrylic monomer (B) and a hydroxyl value adjusting agent (C). These are also referred to as a component (A), a component (B) and a component (C) as appropriate, hereinafter.

In this invention, for the hydroxyl value of a composition containing the component (A) and the component (B) is set to 1 to 100 mgKOH/g using the hydroxyl value adjusting agent (C), when used as an inkjet ink, the composition has excellent dischargeability and photocurability, and also can form a cured product having excellent heat resistance, excellent adhesiveness to substrates, especially silicon substrates, glass substrates, and substrates obtained by Ruining conductors such as metal wiring and electrodes on the above substrates, and excellent ion migration resistance. From the viewpoint of producing a cured product having excellent ion migration resistance, the hydroxyl value of the composition is more preferably 2 to 40 mgKOH/g, further preferably 5 to 40 mgKOH/g. It is noted that the numerical range "A to B" means "A or more and B or less" in this specification.

From the viewpoint of adjusting the hydroxyl value of the composition with the hydroxyl value adjusting agent (C) to form a cured product having excellent ion migration resistance, the hydroxyl value of any of the components (A) and (B) is preferably 100 mgKOH/g or less, more preferably 10 mgKOH/g or less, and even more preferably 0 mgKOH/g.
[Monofunctional Acrylic Monomer (A)]

The composition of this invention contains the monofunctional acrylic monomer (A) in an amount of 40 to 80 wt % relative to 100 wt % of the sum of the weights of the components of the composition.

From the viewpoint of improving the dischargeability when used as an ink and forming a cured product having an good balance of heat resistance, to-substrate adhesiveness, ion migration resistance and so on, the content of the component (A) is preferably 40 to 80 wt % and more preferably 50 to 75 wt %, relative to 100 wt % of the composition.

From the viewpoint of good heat resistance, good adhesiveness to substrates, especially glass substrates, silicon substrates, and substrates obtained by forming conductors such as metal wiring and electrodes on the above substrates, and good ion migration resistance, the monofunctional acrylic monomer (A) preferably comprises a (meth) acrylate having one or more groups of the group consisting of fused-ring hydrocarbon groups, polycyclic hydrocarbon groups and monocyclic hydrocarbon groups.

In this specification, "(meth) acrylate" is used to indicate both or one of acrylate and methacrylate, and "(meth) acryloyl" used to indicate both or one of acryloyl and methacryloyl.

[Monofunctional Acrylic Monomer (a-1) Having a Fused-Ring Hydrocarbon Group or a Polycyclic Hydrocarbon Group]

The monofunctional acrylic monomer (a-1) having a fused-ring hydrocarbon group or a polycyclic hydrocarbon group is not particularly limited, but is preferably a monofunctional acrylic monomer containing an organic group with 7 to 50 carbon atoms having a fused-ring hydrocarbon group or a polycyclic hydrocarbon group, and more preferably a monofunctional acrylic monomer containing an organic group with 7 to 30 carbon atoms having a fused-ring hydrocarbon group or a polycyclic hydrocarbon group.

It is noted that here "monofunctional acrylic monomer" refers to a monomer having one (meth)acryloyl group in one molecule.

A "fused-ring hydrocarbon group" is a hydrocarbon group (consisting of carbon atoms and hydrogen atoms) having two or more rings, and is a hydrocarbon group having at least one carbon constituting a certain ring and at the same time constituting another ring. A "polycyclic hydrocarbon group" is a hydrocarbon group having two or more rings, and is a hydrocarbon group in which one ring and another ring are bonded by a single bond or by an alkylene having 1 to 10 carbon atoms.

Further, the "organic group with 7 to 50 carbon atoms having a fused-ring hydrocarbon group or a polycyclic hydrocarbon group" is, for example, a group containing the $n_A$ repeating units and $R^2$ other than the (meth)acryloyl group in a compound represented by formula (1).

It is preferred to use a compound represented by formula (1) as the monomer (a-1) from the viewpoints of obtaining a cured product having excellent heat resistance, to-substrate adhesiveness and ion migration resistance.

In formula (1), $R^2$ is a monovalent organic group with 4 to 30 carbon atoms having a fused-ring hydrocarbon group or a polycyclic hydrocarbon group, preferably a non-polar monovalent organic group with 4 to 30 carbon atoms having a fused-ring hydrocarbon group or a polycyclic hydrocarbon group, and more preferably a group represented by any one of the above formulae (2) to (5). In addition, $n_A$ is preferably 0 or 1.

In the above formulae (2) to (5), $R^3$ is preferably hydrogen, and * is a bond with the O— at the right end of the above formula (1).

As the monomer (a-1), at least one compound selected from the following compound group (I) is preferred.

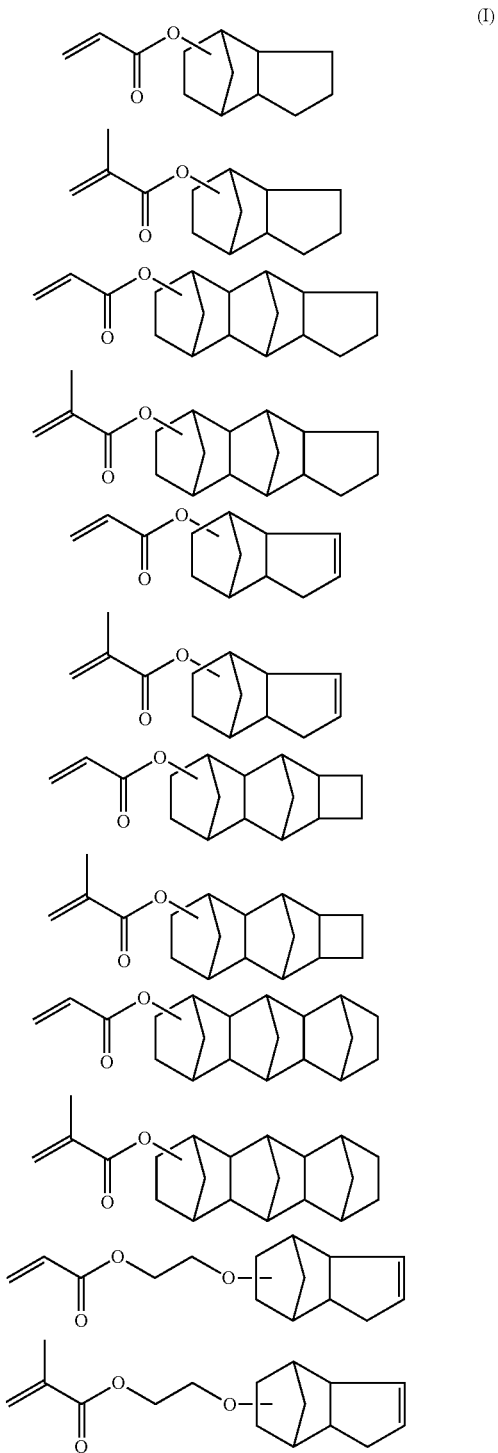

(I)

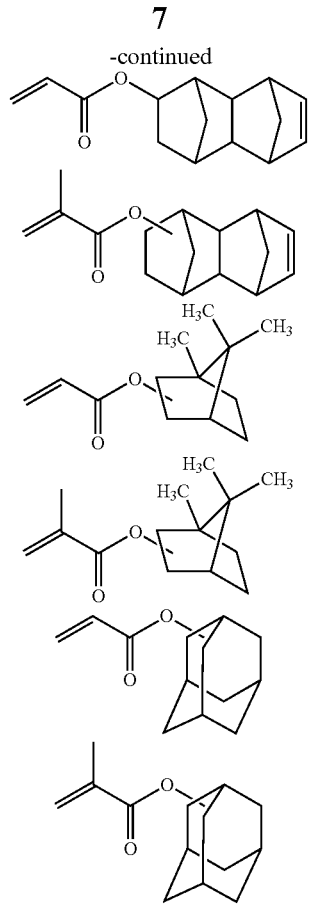

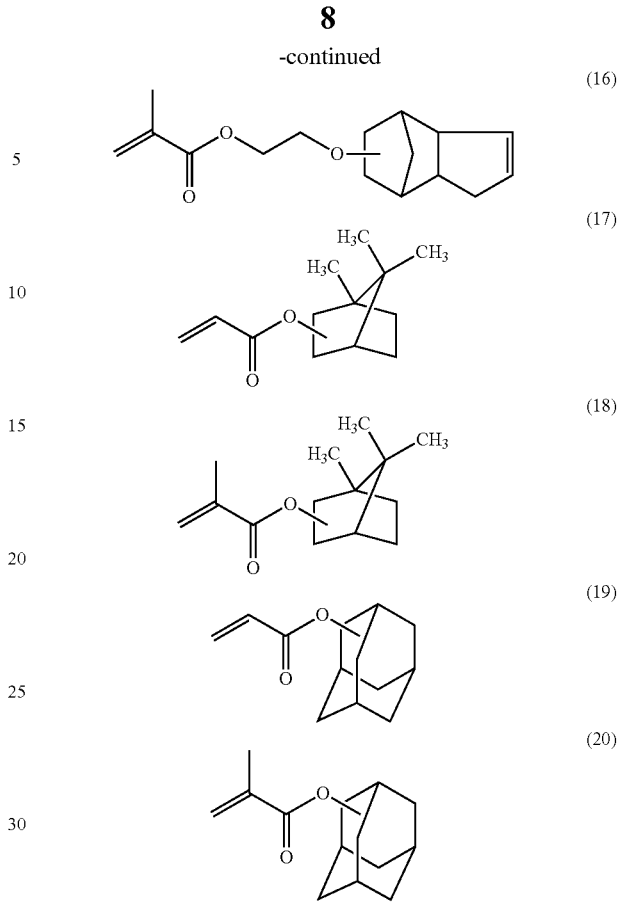

Among these, the following compounds (11) to (20) are more preferred, wherein the compounds (11) and (17) are even more preferred, in consideration of the to-substrate adhesiveness, heat resistance and ion migration resistance of the obtained cured product.

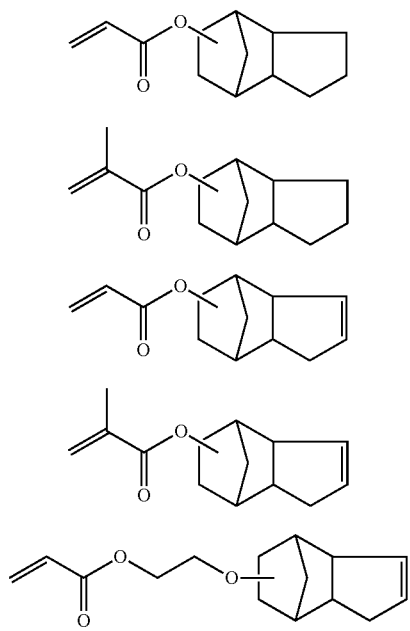

The monomer (a-1) may be one kind of compound selected from the above-mentioned compounds and so on, or may be a mixture of two or more kinds of compounds selected from the same. A mixture of compounds (11) and (17) is preferred, and when the two are used in combination, the weight ratio of compound (11): compound (17) is preferably 5:10 to 10:5, more preferably 7:10 to 10:7, and even more preferably 9:10 to 10:9.

As the monomer (a-1), a compound produced by a known method may be used, or a commercial product may be used, such as dicyclopentanyl acrylate (Fancryl FA-513AS by Hitachi Chemical Co., Ltd.), dicyclopentanyl methacrylate (Fancryl FA-513M by Hitachi Chemical Co., Ltd.), dicyclopentenyl acrylate (Fancryl FA-511AS by Hitachi Chemical Co., Ltd.), dicyclopentenyl methacrylate (Fancryl FA-511M by Hitachi Chemical Co., Ltd.), dicyclopentenyloxyethyl acrylate (Fancryl FA-512AS by Hitachi Chemical Co., Ltd.), dicyclopentenyloxyethyl methacrylate (Fancryl FA-512M by Hitachi Chemical Co., Ltd.), isobornyl acrylate (IB-XA by Kyoeisha Chemical Co., Ltd.), isobornyl methacrylate (IBXMA by Kyoeisha Chemical Co., Ltd.), and 1-adamantyl methacrylate (Adamantate M-104 by Idemitsu Kosan Co., Ltd.), etc.

[Monofunctional Polymerizable Monomer (a-2) Having a Monocyclic Hydrocarbon Group]

The "monocyclic hydrocarbon group" refers to a hydrocarbon group having one ring (including an aromatic ring).

As the monomer (a-2), a compound produced by a known method may be used, or a commercially available product may be used, such as benzyl acrylate, cyclohexyl acrylate (V #155 by Osaka Organic Chemical Industry Ltd.), and cyclohexyl methacrylate (Light Ester CH by Kyoeisha Chemical Co., Ltd.), etc.

[Polyfunctional Acrylic Monomer (B)]

The composition of this invention contains a polyfunctional acrylic monomer (B) in an amount of 10 to 50 wt % relative to 100 wt % of the composition. "Polyfunctional acrylic monomer" refers to a monomer having two or more (meth)acryloyl groups in one molecule.

Specific examples of the monomer (B) include: tricyclodecanedimethanol di(meth)acrylate, ethylene oxide-modified di(meth)acrylates of bisphenol F, ethylene oxide-modified di(meth)acrylates of bisphenol A, ethylene oxide-modified di(meth)acrylates of isocyanuric acid, polyethylene glycol di(meth)acrylates, polypropylene glycol di(meth)acrylates, pentaerythritol di(meth)acrylate, dipentaerythritol di(meth)acrylate, pentaerythritol di(meth)acrylate monostearate, trimethylolpropane di(meth)acrylate, 1,4-butanediol di(meth)acrylate, 1,6-hexanediol di(meth)acrylate, 1,9-nonanediol di(meth)acrylate, 1,4-cyclohexanedimethanol di(meth)acrylate, 2-n-butyl-2-ethyl-1,3-propanediol di(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane tri(meth)acrylate, ethylene oxide modified trimethylolpropane tri(meth)acrylates, propylene oxide-modified trimethylolpropane tri(meth)acrylates, epichlorohydrin-modified trimethylolpropane tri(meth)acrylates, glycerin tri(meth)acrylate, ethylene oxide-modified glycerin tri(meth)acrylates, propylene oxide-modified glycerin tri(meth)acrylates, epichlorohydrin-modified glycerin tri(meth)acrylates, ditrimethylolpropane tetra(meth)acrylate, diglycerin tetra(meth)acrylate, caprolactone-modified dipentaerythritol hexa(meth)acrylates, ethylene oxide-modified tri(meth)acrylates of phosphoric acid, tris[(meth)acryloxyethyl] isocyanurate, caprolactone-modified tris[(meth)acryloxyethyl] isocyanurate, and compounds represented by the above formula (6), etc.

From the viewpoint of improving the ion migration resistance of the cured product formed by the composition, compounds in which $R^5$ in the above formula (6) is a group represented by any one of the above formulae (7) to (10) are preferred, and it is more preferred that the group is represented by formula (7). In addition, $n_B$ is preferably 0 or 1.

The monomer (B) may be one kind of compound selected from the above-mentioned compounds and the like, or may be a mixture of two or more kinds of compounds selected from the same.

In order to obtain a composition having excellent photocurability and obtain a cured product excellent in good balance between heat resistance, to-substrate adhesiveness and ion migration resistance, the content of the monomer (B) in the composition of this invention is preferably 10 to 50 wt %, more preferably 13 to 30 wt % and even more preferably 15 to 25 wt %, relative to 100 wt % of the composition.

[Hydroxyl Value Adjusting Agent (C)]

The composition of this invention contains a hydroxyl value adjusting agent (C). Here, the hydroxyl value adjusting agent (C) is a compound having a hydroxyl value different from those of the components (A) and (B), preferably a compound having a hydroxyl value higher than those of the components (A) and (B). The difference between the hydroxyl value of the component (C) and that of the component (A) is preferably 100 to 300 mgKOH/g, more preferably 150 to 250 mgKOH/g, and even more preferably 160 to 200 mgKOH/g. The difference between the hydroxyl value of the component (C) and that of the component (B) is preferably 100 to 300 mgKOH/g, more preferably 150 to 250 mgKOH/g, and even more preferably 160 to 200 mgKOH/g. The hydroxyl value adjusting agent (C) may be used as one kind or a mixture of two or more kinds.

For the composition of this invention, for example, a hydroxyl-having hydroxyl value adjusting agent (C) is mixed with a monofunctional acrylic monomer (A) having no hydroxyl and a polyfunctional acrylic monomer (B) having no hydroxyl to adjust the hydroxyl value of the entire composition. In such case, from the viewpoint of forming a cured product having good ion migration resistance, the content of the hydroxyl value adjusting agent (C) is preferably 0.1 to 30 wt %, more preferably 0.3 to 25 wt %, and even more preferably from 0.5 to 20 wt %, relative to 100 wt % of the composition.

Because it is easy to adjust the hydroxyl value of the composition to a predetermined range with the above-mentioned preferred mixing amounts, the hydroxyl value of the hydroxyl value adjusting agent (C) is preferably 100 to 300 mgKOH/g, more preferably 150 to 250 mgKOH/g, and even more preferably 160 to 200 mgKOH/g.

From the viewpoint of forming a cured product having good ion migration resistance, it is preferred that the hydroxyl value adjusting agent (C) includes an acrylic oligomer or a hydroxyl-having (meth)acrylic monomer. The hydroxyl value adjusting agent (C) may include only one of these, or may include two or more of these. The weight average molecular weight of the hydroxyl value adjusting agent (C) is preferably 100 to 5000, more preferably 450 to 3000, and even more preferably 700 to 1500. From the same viewpoint, the glass transition point (Tg) of the hydroxyl value adjusting agent (C) is preferably 85° C. or higher, and more preferably 90° C. or higher.

Examples of the hydroxyl-having (meth)acrylic monomer include: monoesterified products of (meth)acrylic acid and a dihydric alcohol having 2 to 8 carbon atoms, δ-caprolactone modified products of monoesterified products of (meth)acrylic acid and a dihydric alcohol having 2 to 8 carbon atoms, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, 1,4-cyclohexanedimethanol monoacrylate (CHDMMA), and a compound obtained by reacting a part of the hydroxyl groups of a polyol having plural hydroxyl groups with (meth)acrylic acid to esterify them.

In addition, compounds obtained by adding (meth)acrylic acid to the oxirane ring or the oxetane ring of an epoxy compound having an oxirane ring or an oxetane ring to esterify it may also be used as a hydroxyl-having acrylic monomer. Examples of such compounds include epoxy ester M-600A, epoxy ester 40EM, epoxy ester 70PA, epoxy ester 200PA, epoxy ester 80MFA, epoxy ester 3002M (N), epoxy ester 3002A (N), epoxy ester 3000MK and epoxy ester 3000A (produced by Kyoeisha Chemical Co., Ltd.), and (meth)acrylic acid adducts of the following epoxy compounds, etc.

The epoxy compounds are epoxy compounds "jER807" (epoxy equivalent: 160-175 g/eq), "jER815", "jER825" (epoxy equivalent: 170-180 g/eq), "jER827" (epoxy equivalent: 180-190 g/eq), "jER828" (epoxy equivalent: 184-194 g/eq), "jER190P", "jER191P", "jER1001" (epoxy equivalent: 450-500 g/eq), "jER1002" (epoxy equivalent: 600-700 g/eq), "jER1004" (epoxy equivalent: 875-975 g/eq), "jER1004AF" (epoxy equivalent: 875-975 g/eq), "jER1007" (epoxy equivalent: 1750-2200 g/eq), "jER1010"

(epoxy equivalent: 3000-5000 g/eq), "jER157S70" (epoxy equivalent: 200-220 g/eq), "JER1032H60" (epoxy equivalent: 163-175 g/eq) and "ER1256" (epoxy equivalent: 7500-8500 g/eq) (all produced by Mitsubishi Chemical Corporation), "Celloxide 2021P" (epoxy equivalent: 128-145 g/eq), "Celloxide 3000", "EHPE-3150" (epoxy equivalent: 170-190 g/eq) and "EHPE-3150CE" (epoxy equivalent: 147-157 g/eq) (all produced Daicel Corporation), "TECHMORE VG3101L" (produced by Printec Corporation; epoxy equivalent: 210 g/eq), "HP7200" (epoxy equivalent: 254-264 g/eq), "HP7200H" (epoxy equivalent: 272-284 g/eq) and "HP7200HH" (epoxy equivalent: 274-286 g/eq) (all produced by DIC Corporation), "NC-3000" (epoxy equivalent: 265-285 g/eq), "NC-3000H" (epoxy equivalent: 280-300 g/eq), "EOCN-102S" (epoxy equivalent: 205-217 g/eq), "EOCN-103S" (epoxy equivalent: 209-219 g/eq), "EOCN-104S" (epoxy equivalent: 213-223 g/eq), "EPPN-501H" (epoxy equivalent: 162-172 g/eq), "EPPN-501HY" (epoxy equivalent: 163-175 g/eq), "EPPN-502H" (epoxy equivalent: 158-178 g/eq) and "EPPN-201" (epoxy equivalent: 180-200 g/eq) (all produced by Nippon Kayaku Co., Ltd.), "TEP-G" (epoxy equivalent: 160-180 g/eq) (produced by Asahi Yukizai Corporation), "MA-DGIC" (epoxy equivalent: 140 g/eq), "DA-MGIC" (epoxy equivalent: 265 g/eq) and "TG-G" (epoxy equivalent: 92 g/eq) (all produced by Shikoku Chemicals Corporation), "TEPIC-VL" (epoxy equivalent: 125-145 g/eq) (produced by Nissan Chemical Corporation), "NANOPOX C620" (produced by EVONIK; epoxy equivalent: ~220 g/eq), "ADEKA Resin EP-4088" (produced by ADEKA Corporation; epoxy equivalent: 170 g/eq), N,N,N',N'-tetraglycidyl-m-xylenediamine, 1,3-bis(N, N-diglycidylaminomethyl)cyclohexane, N,N,N',N'-tetraglycidyl-4,4'-diaminodiphenylmethane, γ-glycidoxypropyltrimethoxysilane (epoxy equivalent: 194 g/eq), γ-glycidoxypropylmethyldimethoxysilane, γ-glycidoxypropylmethyldiethoxysilane, γ-glycidoxypropyltriethoxysilane, and a (meth)acrylic acid adduct of an epoxy compound represented by the following formula (21). In formula (21), $R^6$ is a group represented by any one of the above formulas (7) to (10), and each $n_C$ is independently an integer from 0 to 10.

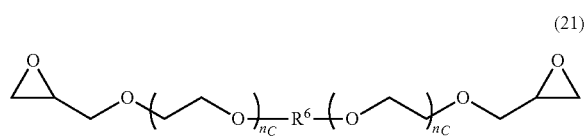

(21)

[Photopolymerization Initiator (D)]

The composition of this invention may further contain a photopolymerization initiator (D).

The photopolymerization initiator may be any compound that can generate radicals with irradiation of UV light, visible light or electromagnetic wave, etc. and initiate polymerization of the monomer components contained in the composition of this invention, and generally used ones can be used. Specific examples of the photopolymerization initiator include: benzophenone, Michler's Ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, 1,1'-(methylene-di-4,1-phenylene)bis(2-hydroxy-2-methyl-1-propanone), camphorquinone, benzanthrone, 2-methyl-1-[4-(methylthio)phenyl]-morpholinopropane-1-one, 2-(4-methylbenzyl)-2-(dimethylamino)-1-(4-morpholinophenyl)butane-1-one, 2-benzyl-2-dimethylamino-1-(4-morpholinophenyl)-butanone-1, ethyl 4-dimethylaminobenzoate, isoamyl 4-dimethylaminobenzoate, 4,4'-di(tert-butylperoxycarbonyl)benzophenone, 3,4,4'-tri(tert-butylperoxycarbonyl) benzophenone, 2,4,6-trimethylbenzoyldiphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzthiazole, 2-mercaptobenzothiazole, 3,3'-carbonylbis (7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, bis(η5-2,4-cyclopentadien-1-yl)bis(2,6-difluoro-3-(1H-pyrrol-1-yl)phenyl) titanium, 3,3',4,4'-tetra(tert-butylperoxycarbonyl) benzophenone, 3,3',4,4'-tetra(tert-hexylperoxycarbonyl) benzophenone, 3,3'-di(methoxycarbonyl)-4,4'-di(tert-butylperoxycarbonyl)benzophenone, 3,4'-di(methoxycarbonyl)-4,3'-di(tert-butylperoxycarbonyl) benzophenone, and 4,4'-di(methoxycarbonyl)-3,3'-di(tert-butylperoxycarbonyl)benzophenone, etc. Examples of commercially available products include Irgacure 379EG, Irgacure 127 and Irgacure 184 produced by BASF, and Omnirad 379EG, Omnirad 127 and Omnirad 184 produced by IGM Resins B.V., etc. Among the above, 2-(4-methylbenzyl)-2-(dimethylamino)-1-(4-morpholinophenyl)butan-1-one is preferred.

From the viewpoint of forming a cured product having good ion migration resistance, the photopolymerization initiator (D) is preferably 5 to 15 wt % and more preferably 7 to 12 wt %, relative to 100 wt % of the composition. The photopolymerization initiator (D) may be one kind of compound or a mixture of two or more kinds of compounds.

[Inkjet Ink Composition & Active Energy Ray-Curable Ink Composition]

When the composition of this invention is used as an inkjet composition, from the viewpoint of improving the dischargeability, the viscosity thereof at 25° C. is preferably 1 to 100 mPa·s, and more preferably 3 to 70 mPa·s.

This invention can also be implemented as an inkjet ink composition comprising the composition of this invention, and an active energy ray-curable ink composition comprising the inkjet ink composition. Here, the active energy ray means an energy ray able to decompose a compound capable of generating an active species to generate an active species. Examples of such active energy rays include light energy rays such as visible light, ultraviolet light, infrared light, X-rays, α-rays, β-rays, γ-rays, and electron beams, etc.

In order to improve various properties, the composition of this invention may contain other components, such as a flame retardant, a resin containing phenolic hydroxyl groups, a melamine resin, an epoxy compound, an oxetane compound, a curing agent, a surfactant, a colorant, a polymerization inhibitor, and a solvent, etc., as long as the effects of this invention are not impaired.

[Cured Product]

The cured product of this invention is obtained by photocuring the composition of this invention.

When the composition of this invention is used as an inkjet ink, the cured product can be produced by a method including the following steps 1 and 2.

Step 1 is applying the composition of this invention onto a substrate by an inkjet method to form a coating film.

Step 2 is irradiating the coating film obtained in step 1 with light to cure the coating film and form a cured product on the substrate.

The inkjet method is not particularly limited, and a known inkjet method can be used. The substrate is not particularly limited as long as it can be applied with the ink of this invention, and its shape is not limited to a flat plate shape and may be a curved surface shape or the like.

The substrate is not particularly limited, and examples thereof include: a polyester resin substrate made of polyethylene terephthalate (PET) or polybutylene terephthalate (PBT), etc.; a polyolefin resin substrate made of polyethylene or polypropylene, etc.; an organic polymer film made of polyvinyl chloride, fluororesin, acrylic resin, polyamide, polycarbonate or polyimide, etc.; cellophane; metal foils; a laminated film of polyimide and metal foil; a glassine paper, a parchment paper, and a paper having been subjected to a sealing treatment using polyethylene, clay binder, polyvinyl alcohol, starch or carboxymethyl cellulose (CMC), etc., which have a sealing effect; a silicon substrate; and a glass substrate.

By using the inkjet method, the ink of this invention can be easily applied in a predetermined pattern, and a uniform pattern can be formed on a large substrate.

The temperature at the time of discharge by the inkjet coating device is preferably 10° C. to 120° C. The viscosity of the ink of this invention at the temperature is preferably 1 to 30 mPa·s, more preferably 2 to 25 mPa·s, and even more preferably 3 to 20 mPa·s.

When using an ink having a viscosity of more than 30 mPa·s at 25° C., heating the inkjet head to lower the viscosity of the ink at the time of discharge enables more stable discharge. In cases where jetting is performed by heating the inkjet head, the heating temperature is preferably 40° C. to 120° C. In cases where the inkjet head is heated, it is preferred to use an ink that does not contain a solvent.

The thickness of the obtained coating film may be appropriately selected depending on the desired application, but is preferably 1 to 20 µm, and more preferably 5 to 15 µm.

When irradiating with ultraviolet light or visible light, etc., the dose of exposure to be irradiated may be appropriately adjusted according to the composition of the composition of this invention, but when a UV monitor made by Opsytec ("UV-Pad"; wavelength: UV-A (315-400 nm)), the dose is preferably about 100 to 10,000 mJ/cm$^2$, more preferably about 150 to 5000 mJ/cm$^2$, even more preferably about 180 to 3000 mJ/cm$^2$, and particularly preferable about 200 to 2000 mJ/cm$^2$. The wavelength of the ultraviolet light or visible light, etc. to be irradiated is preferably 200 to 500 nm, more preferably 300 to 450 nm.

An exposure machine may be used when irradiating light. The exposure machine is equipped with a UV-LED lamp, a high-pressure mercury lamp, an ultra-high pressure mercury lamp, a metal halide lamp, a halogen lamp, or a black light lamp, etc. A device that irradiates ultraviolet light or visible light, etc. in the range of 200 to 500 nm is preferred.

Further, if necessary, the cured product cured by light irradiation may be further heated and baked. A stronger cured product can be obtained by heating and baking at 80 to 250° C. for 10 to 60 minutes.

The thickness of the cured product of this invention may be appropriately selected depending on the desired use, but is preferably 1 to 20 µm, and more preferably 5 to 15 µm.

From the viewpoint of fabricating a highly reliable electronic circuit substrate or the like, the cured product of this invention preferably has a glass transition temperature of 85° C. or higher, more preferably 90 to 150° C., as measured using DMS6000 (Hitachi High-Technologies Corporation). As a reliability test of electronic circuit board, a voltage application insulation resistance test (hereinafter referred to as an ion migration resistance test) in an environment of constant temperature and humidity may be carried out. In the ion migration resistance test, a specific voltage is applied for specific time under a specific environment of constant temperature and humidity, and presence or absence of an abnormality in the resistance value at that time is confirmed. In particular, evaluation is often performed at a high temperature of 85° C. to 130° C. Therefore, in order to obtain a highly reliable electronic circuit board or the like, it is desirable that the glass transition temperature of the cured product is within the above range.

Because the cured product of this invention has excellent heat resistance, to-substrate adhesiveness and ion migration resistance, it is suitably used as a protective film or an insulating film in a display element such as liquid crystal display element or EL display element, etc., or an electronic circuit board such as a printed wiring board, a flexible wiring board, a semiconductor packages substrate or a solar cell substrate, etc. Further, the cured product of this invention is suitably used in a coverlay film or a solder resist, etc. for protecting conductors such as metal wiring, electrodes and so on for forming a predetermined circuit pattern.

[Electronic Component]

It is preferred that the electronic component of this invention contains the cured product of this invention and is produced by a method including the above steps 1 and 2. Since the cured product of the present invention is excellent in heat resistance, to-substrate adhesiveness and ion migration resistance, etc., the electronic component of this invention is an electronic component excellent in electrical characteristics, long-term reliability, and so on.

EXAMPLES

Hereinafter, this invention will be described in more details based on Examples, but this invention is not limited to these Examples.

The following components were used in the Examples and Comparative Examples. As appropriate, the abbreviations shown below are used to indicate the respective components.

[Monofunctional Acrylic Monomer (A)]

FA-513AS: dicyclopentanyl acrylate (trade name "Fancryl FA-513AS" from Hitachi Chemical Co., Ltd.; hydroxyl value: 0 mgKOH/g; homopolymer glass transition point (Tg): 120° C.).

IB-XA: isobornyl acrylate (trade name "IB-XA" from Kyoeisha Chemical Co., Ltd.; hydroxyl value: 0 mgKOH/g; Tg=97° C.).

THFA: tetrahydrofurfuryl acrylate (hydroxyl value: 0 mgKOH/g, Tg=−10° C.).

FX-AO-MA: methyl 2-allyloxymethylacrylate (trade name "FX-AO-MA" from Nippon Shokubai Co., Ltd.; hydroxyl value: 0 mgKOH/g, Tg=−84° C.).
FA-BZA: benzyl acrylate (hydroxyl value: 0 mgKOH/g; Tg=6° C.)
[Polyfunctional Acrylic Monomer (B)]
IRR214-K: tricyclodecanedimethanol diacrylate (hydroxyl value: 0 mgKOH/g; Tg=190° C.).
M208: ethylene oxide modified (n=2) diacrylate of bisphenol F (hydroxyl value: 0 mgKOH/g, Tg=75° C.)
[Hydroxyl Value Adjusting Agent (C)]
OT-2503: acrylic oligomer (trade name "Aronix OT-2503" from Toagosei Co., Ltd.; weight average molecular weight: 1000; hydroxyl value: 172 mgKOH/g, Tg=94° C.).
Bifunctional monomer A: acrylic acid adduct of dicyclopentanyl diglycidyl ether (weight average molecular weight: 452.54; hydroxyl value: 247.98 mgKOH/g).
3000A: acrylic acid adduct of bisphenol A diglycidyl ether (Epoxy Ester 3000A from Kyoeisha Chemical Co., Ltd.; weight average molecular weight: 484.55; hydroxyl value: 231.60 mgKOH/g).
4HBA: 4-hydroxybutyl acrylate (hydroxyl value: 389 mgKOH/g; Tg=−32° C.).
M305: pentaerythritol triacrylate and pentaerythritol tetraacrylate (trade name "Aronix M305" from Toagosei Co., Ltd.; weight average molecular weight: 323; hydroxyl value: 116 mgKOH/g; Tg=107° C.)
[Photopolymerization Initiator (D)]
Irg379: 2-(4-methylbenzyl)-2-(dimethylamino)-1-(4-morpholinophenyl)butan-1-one (trade name "Irgacure 379" from BASF Japan Ltd.)

Example 1

<Preparation of Photocurable Composition>

35 g of FA-513AS and 35 g of IB-XA as the monofunctional acrylic monomer (A), 20 g of IRR214-K as the polyfunctional (bifunctional) acrylic monomer (B), 10 g of OT-2503 as the hydroxyl value adjusting agent (C), and 10 g of Irg379 as the photopolymerization initiator (D) were mixed to obtain a solution, and then filtration was performed with a membrane filter made of ultra-high molecular weight polyethylene (hydrophobic) having a pore size of 0.2 μm (Nihon Entegris G. K.) to obtain a filtrate (photocurable composition, used as "inkjet ink 1"). The viscosity of the photocurable composition at 25° C. was measured using an E-type viscometer (TV-22 of Toki Sangyo Co., Ltd.; the same applies hereinafter) to be 36.2 mPa·s.

<Formation of Cured Product>

The inkjet ink 1 was injected into an inkjet cartridge DMC-11610 (made by FUJIFILM Corporation), the cartridge was mounted on an inkjet apparatus (DMP-2831 made by FUJIFILM Corporation), and, under discharge conditions including a discharge voltage (piezo voltage) of 17 to 25 V, a head temperature of 32-70° C., a driving frequency of 5 kHz and one time of discharge, a square pattern with a sidelength of 3 cm was drawn on a flexible copper-clad laminate (made by Connectec Japan Corporation; referred to as "Cu substrate" hereafter), and a pattern was drawn on a substrate with an opposed combs-shaped electrode pattern (made by Connectec Japan Corporation) to cover the overlap margins of the comb-shaped electrodes.

A UV-LED lamp "ASM1503NM-UV-LED" (made by Asumi Giken, Limited; lamp wavelength: 365 nm) was used on the Cu substrate on which the square pattern has been aimed and the substrate with an opposed combs-shaped electrode pattern to irradiate them with UV light having a wavelength of 365 nm at an exposure dose of 5000 mJ/cm$^2$ (measured with the UV monitor "UV-Pad" made by Opsytec; wavelength: UV-A (315-400 nm)) and thus photocure the patterns. By heating and baking the photocured patterns at 175° C. for 60 minutes in a clean oven DT-610 (made by Yamato Scientific co., ltd.), a Cu substrate (Cu substrate 1) on which a cured product having a thickness of 10 μm was formed and a substrate 1 with an opposed combs-shaped electrode pattern were obtained.

The film thickness of the cured product was determined by measuring the film thickness of the cured product on the Cu in the Cu substrate 1 on which the cured product had been formed, and the film thickness of the cured product on the opposed combs-shaped electrodes in the substrate 1 with the opposed combs-shaped electrode pattern on which the cured product had been formed, using a laser microscope VK-X100 (made by Keyence Corporation).

<Preparation of Samples for Ion Migration Resistance Evaluation (IMG Samples)>

An electromagnetic wave shield film SF-PC5900-C (made by Tatsuta Electric Wire & Cable Co., Ltd.) was hot-pressed (3 MPa×175° C.×3 minutes) and pasted on a predetermined position of the substrate 1 with the opposed combs-shaped electrode pattern on which the cured product had been placed, so as to prepare IMG sample 1.

Examples 2 to 14, Comparative Examples 1 to 5

Inkjet inks 2 to 19 were prepared by the same method as in Example 1 except that the respective components of Example 1 were changed as shown in Tables 1 to 3. With inks 2 to 18 excluding ink 19, IMG samples 2 to 18 and Cu substrates 2 to 18 were prepared.

<Evaluation Methods>

<Evaluations of Inkjet Ink and Patterned Cured Product>

The dischargeabilities and photocurabilities of inkjet inks 1 to 19 obtained above, the ion migration resistances, and the to-substrate adhesiveness and heat resistance (glass transition temperature) of the cured products were evaluated.

Each test method and its evaluation criteria are described below, and the evaluation results are shown in Tables 1 to 3. The numerical values representing the contents of the components (A), (B), (C) and (D) in the tables are all in wt %.

(Ion Migration Resistance Test)

The ion migration resistances of the IMG samples (1 to 18) obtained above were evaluated by the following method.

The obtained IMG sample was connected with an ion migration tester MIG-87 (made by IMV Corporation) by wiring and placed in a small environmental tester SH-641 (made by Espec Corp.), and then a DC voltage of 100 V was applied for 100 hours under an environment of 85° C.×85% RH.

(Evaluation Criteria)

The above test was performed to 4 or 2 IMG samples, and the sample showing a resistance value of $1\times10^6$ or more at the end of the 100 hours of application was taken as a passing sample. Ion migration resistance was evaluated by the number of samples that passed the test.

X/4: among the 4 IMG samples, X samples passed the test.

X/2: among the 2 IMG samples, X samples passed the test.

(Ink Dischargeability Test)

The dischargeabilities of the inks (1-19) obtained in respective Examples and Comparative Examples were evaluated. The evaluation criteria are as follows.

○: Good discharge of 12 or more contiguous nozzles.
Δ: Good discharge of 4 to 11 contiguous nozzles.
x: Good discharge of 4 or less contiguous nozzles.

(Wettability Test)

The wettability of the inks was evaluated by visually observing the disorder and printing blur of the pattern formed on the Cu substrate obtained in each Example or Comparative Example. The evaluation criteria are described below.

○: The predetermined pattern could be printed, and printing streaks were not seen.
Δ: The predetermined pattern could be printed, but printing streaks were seen.
x: There was a part that cannot be printed in the predetermined pattern.

(Adhesiveness: Cross-Cut Peeling Test)

The cured product obtained on the Cu substrates (1 to 18) was cross-cut into 1 mm×1 mm square (checker) shapes to prepare 100 regions surrounded by the cuts. An adhesive peeling tape was attached from above the regions, and evaluation was performed based on the number of peeled regions when peeled. The results were evaluated according to the following evaluation criteria. As the peeling tape, Scotch #610 (product name, produced by 3M) of 402 N/100 mm (longitudinal direction) was used.

(Evaluation Criteria)

ⓒ: None of the 100 regions was peeled off.
○: Defect regions (peeled regions) occupied 5% or less.
Δ: Defect regions (peeled regions) occupied more than 5% to 50%.
x: Defect regions (peeled regions) occupied more than 51%.

TABLE 1

|     |                       | Example 1 | Example 2 | Example 3 | Example 4 | Example 5 | Example 6 | Example 7 |
|-----|-----------------------|-----------|-----------|-----------|-----------|-----------|-----------|-----------|
| (A) | FA-513 AS             | 35        | 70        |           |           |           |           | 35        |
|     | IB-XA                 | 35        |           | 70        |           |           |           | 35        |
|     | THFA                  |           |           |           | 70        |           |           |           |
|     | FX-AO-MA              |           |           |           |           | 70        |           |           |
|     | FA-BZA                |           |           |           |           |           | 70        |           |
| (B) | IRR214-K              | 20        | 20        | 20        | 20        | 20        | 20        | 20        |
|     | M208                  |           |           |           |           |           |           |           |
| (C) | OT-2503               | 10        | 10        | 10        | 10        | 10        | 10        | 1         |
|     | M305                  |           |           |           |           |           |           |           |
|     | Bifunctional monomer A |          |           |           |           |           |           |           |
|     | 3000A                 |           |           |           |           |           |           |           |
|     | 4HBA                  |           |           |           |           |           |           |           |
| (D) | Irg379                | 10        | 10        | 10        | 10        | 10        | 10        | 9.1       |
| Ink | Hydroxyl value        | 17        | 17        | 17        | 17        | 17        | 17        | 2         |
|     | Tg                    | 121       | 129       | 112       | 24        | 102       | 38        | 123       |
|     | Viscosity             | 36.2      | 42.3      | 31.3      | 9.7       | 4.8       | 7.5       | 23.6      |
|     | IMG resistance        | 4/4       | 4/4       | 4/4       | 2/4       | 3/4       | 2/4       | 4/4       |
|     | Wettability           | ○         | ○         | ○         | ○         | ○         | ○         | ○         |
|     | Inkjet dischargeability | ○       | ○         | ○         | Δ         | ○         | ○         | ○         |
|     | Adhesiveness (Cu)     | ⓒ         | ⓒ         | ○         | ○         | ⓒ         | ○         | ⓒ         |
|     | Inkjet temperature    | 50° C.    | 50° C.    | 50° C.    | 45° C.    | 32° C.    | 40° C.    | 50° C.    |
|     | Inkjet voltage        | 22 V      | 22 V      | 21 V      | 18 V      | 17 V      | 17 V      | 21 V      |

TABLE 2

|     |                       | Example 8 | Example 9 | Example 10 | Example 11 | Example 12 | Example 13 | Example 14 |
|-----|-----------------------|-----------|-----------|------------|------------|------------|------------|------------|
| (A) | FA-513 AS             | 35        | 35        | 35         | 30         | 40         | 35         | 35         |
|     | IB-XA                 | 35        | 35        | 35         | 30         | 40         | 35         | 35         |
|     | THFA                  |           |           |            |            |            |            |            |
|     | FX-AO-MA              |           |           |            |            |            |            |            |
|     | FA-BZA                |           |           |            |            |            |            |            |
| (B) | IRR214-K              | 20        | 20        |            | 30         | 10         | 20         | 20         |
|     | M208                  |           |           | 20         |            |            |            |            |
| (C) | OT-2503               | 5         | 20        | 10         | 10         | 10         |            |            |
|     | Bifunctional monomer A |          |           |            |            |            | 6          |            |
|     | 3000A                 |           |           |            |            |            |            | 6          |
|     | 4HBA                  |           |           |            |            |            |            |            |
|     | M305                  |           |           |            |            |            |            |            |
| (D) | Irg379                | 9.5       | 11        | 10         | 10         | 10         | 9.5        | 9.5        |
| Ink | Hydroxyl value        | 9         | 31        | 17         | 17         | 17         | 15         | 14         |
|     | Tg                    | 122       | 118       | 100        | 128        | 113        | 115        | ND         |
|     | Viscosity             | 28.8      | 55.2      | 44.1       | 47.6       | 28.6       | 34.8       | 30.8       |
|     | IMG resistance        | 4/4       | 4/4       | 2/4        | 4/4        | 3/4        | 2/2        | 2/2        |
|     | Wettability           | ○         | ○         | ○          | ○          | ○          | ○          | ○          |
|     | Inkjet dischargeability | ○       | ○         | Δ          | ○          | ○          | ○          | ○          |

TABLE 2-continued

| | Example | | | | | | |
|---|---|---|---|---|---|---|---|
| | 8 | 9 | 10 | 11 | 12 | 13 | 14 |
| Adhesiveness (Cu) | ◎ | ◎ | ○ | ◎ | ○ | ○ | ○ |
| Inkjet temperature | 50° C. | 50° C. | 55° C. | 55° C. | 50° C. | 55° C. | 55° C. |
| Inkjet voltage | 21 V | 21 V | 21 V | 21 V | 21 V | 19 V | 19 V |

ND: not measured.

TABLE 3

| | | Comparative Example | | | | |
|---|---|---|---|---|---|---|
| | | 1 | 2 | 3 | 4 | 5 |
| (A) | FA-513 AS | | 35 | 35 | 35 | 35 |
| | IB-XA | | 35 | 35 | 35 | 35 |
| | THFA | | | | | |
| | FX-AO-MA | | | | | |
| | FA-BZA | | | | | |
| (B) | IRR214-K | 20 | 20 | 20 | 20 | 20 |
| | M208 | | | | | |
| (C) | OT-2503 | 10 | | | | 40 |
| | Bifunctional monomer A | | | | | |
| | 3000A | | | | | |
| | 4HBA | 70 | 4.4 | | | |
| | M305 | | | | | 16 |
| (D) | Irg379 | 10 | 9.44 | 9 | 10.6 | 13 |
| Ink | Hydroxyl value | 290 | 18 | 0 | 18 | 53 |
| | Tg | 4 | 112 | 124 | 121 | 114 |
| | Viscosity | 23.8 | 20.5 | 22.1 | 35.0 | 120.7 |
| | IMG resistance | 0/4 | 0/4 | 0/4 | 0/4 | ND |
| | Wettability | ○ | Δ | Δ | Δ | x |
| | Inkjet dischargeability | ○ | ○ | ○ | Δ | x |
| | Adhesiveness (Cu) | ○ | Δ | Δ | x | ND |
| | Inkjet temperature | 50° C. | 50° C. | 50° C. | 55° C. | 70° C. |
| | Inkjet voltage | 19 V | 21 V | 21 V | 22 V | 25 V |

ND: not measured.

As shown in Tables 1-3, by containing OT-2503, the bifunctional monomer A or 3000A as the hydroxyl value adjusting agent (C) in the composition, the ion migration resistance (called "IMG resistance" as appropriate, hereinafter), wettability and adhesiveness of the cured product were improved. From this result, it can be considered that setting the hydroxyl value of the composition to 1 to 100 mgKOH/g is effective in forming a cured product having excellent adhesiveness and IMG resistance. That the hydroxyl value of the composition affects the IMG resistance is possibly due to that the hydroxyl value adjusting agent (C) exerted surface-active effect to some extent to adjust the balance between hydrophilicity and hydrophobicity in order to improve the wettability of the composition.

Furthermore, Comparative Example 1 in which the hydroxyl value of the composition was higher than 100 mgKOH/g had low IMG resistance. A reason of this can be considered as the fact that if the hydroxyl value of the composition was overly high, the amount of water taken up by the cured product became overly large.

By using an acrylic oligomer as the hydroxyl value adjusting agent (C), a cured product having high IMG resistance could be stably formed. When the acrylic oligomer was used, by setting its content in the composition to be 1 wt % or more, a cured product having high IMG resistance was obtained. However, because the viscosity of the composition increases as the content of the acrylic oligomer increases, it can be considered that the hydroxyl value adjusting agent (C) is preferably 25 wt % or less when the composition is used as an inkjet ink. Further, even when a (meth) acrylic monomer having a hydroxyl group was used, a cured product having high IMG resistance could still be formed as in the case of the acrylic oligomer.

It was found that even if cured products had the same wettability and adhesiveness, their IMG resistances might be different. From the viewpoint of obtaining a cured product having good IMG resistance, the monofunctional acrylic monomer (A) and the polyfunctional acrylic monomer (B) having a fused-ring hydrocarbon group or a polycyclic hydrocarbon group were preferred. This result is considered to be due to the fact that the adhesiveness of the cured product to inorganic substances such as Cu was improved by the cyclic skeleton.

From the viewpoint of obtaining a cured product having good IMG resistance, the monofunctional acrylic monomer (A) was preferably a monomer of which the homopolymer has a glass transition point (Tg) of 90° C. or higher. Moreover, from the same viewpoint, when a bifunctional acrylic monomer is used as the polyfunctional acrylic monomer (B), it is preferably added in an amount of 8 wt % or more of the composition. This result is considered to be due to the fact that the crosslink density of the cured product is increased by increasing the content of the bifunctional acrylic monomer. However, if the crosslink density becomes overly high, curing shrinkage may increase, and the adhesiveness of the cured product may decrease. Hence, the bifunctional acrylic monomer preferably occupies 50 wt % or less of the composition.

INDUSTRIAL APPLICABILITY

The photocurable composition of this invention can be utilized to form a cured product that is excellent in the adhesiveness to a silicon substrate, a glass substrate, a polyimide substrate, or a substrate obtained by forming conductors such as metal wiring and electrodes on an above substrate, and excellent in the ion migration resistance.

The invention claimed is:
1. A photocurable composition, comprising:
a monofunctional acrylic monomer (A) in an amount of 40 to 80 wt % relative to 100 wt % of the photocurable composition,
a polyfunctional acrylic monomer (B) in an amount of 10 to 50 wt % relative to 100 wt % of the photocurable composition, and
a hydroxyl value adjusting agent (C) in an amount of 0.1 to 30 wt % relative to 100 wt % of the photocurable composition,
wherein a hydroxyl value of the photocurable composition is 1 to 100 mgKOH/g, and
the hydroxyl value adjusting agent (C) has a hydroxyl value of 150 to 250 mgKOH/g and a weight average molecular weight of 100 to 5000.

2. The photocurable composition of claim 1, wherein the hydroxyl value adjusting agent (C) comprises an acrylic oligomer, or a hydroxyl-having (meth)acrylic monomer.

3. The photocurable composition of claim 1, wherein the monofunctional acrylic monomer (A) comprises a (meth)acrylate having one or more groups of the group consisting of fused-ring hydrocarbon groups, polycyclic hydrocarbon groups and monocyclic hydrocarbon groups.

4. The photocurable composition of claim 3, wherein the monofunctional acrylic monomer (A) is a monofunctional acrylic monomer represented by formula (1):

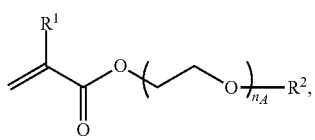
(1)

wherein in formula (1), $R^1$ is hydrogen or methyl, $R^2$ is a monovalent organic group with 4 to 30 carbon atoms having a fused-ring hydrocarbon group, a polycyclic hydrocarbon group or a monocyclic hydrocarbon group, and $n_A$ is an integer from 0 to 10.

5. The photocurable composition of claim 4, wherein $R^2$ in formula (1) is a group represented by any one of formulae (2) to (5):

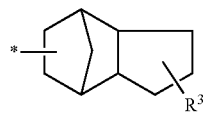
(2)

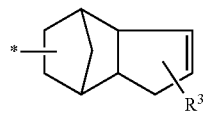
(3)

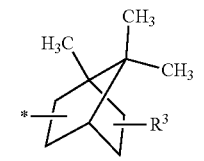
(4)

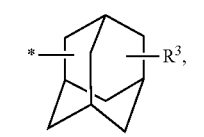
(5)

wherein in formulae (2) to (5), each $R^3$ is independently hydrogen or an alkyl having 1 to 6 carbon atoms, and * represents a bond.

6. The photocurable composition of claim 5, wherein the polyfunctional acrylic monomer (B) is a bifunctional acrylic monomer represented by formula (6):

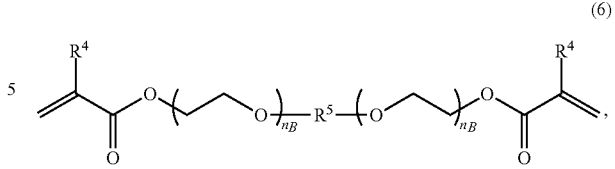
(6)

wherein in formula (6), each $R^4$ is independently hydrogen or methyl, $R^5$ is a divalent organic group with 4 to 30 carbon atoms having a fused-ring hydrocarbon group, a polycyclic hydrocarbon group or a monocyclic hydrocarbon group, and each np is independently an integer from 0 to 10.

7. The photocurable composition of claim 6, wherein $R^5$ in formula (6) is a group represented by any one of formulae (7) to (10):

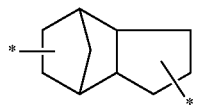
(7)

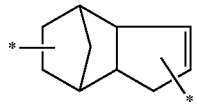
(8)

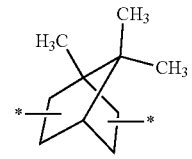
(9)

(10)

wherein in formulae (7) to (10), * represents a bond.

8. The photocurable composition of claim 1, further comprising a photopolymerization initiator (D) in an amount of 5 to 15 wt % relative to 100 wt % of the photocurable composition.

9. The photocurable composition of claim 1, which has a viscosity of 1 to 100 mPa·s at 25° C.

10. The photocurable composition of claim 1, which has a hydroxyl value of 5 to 40 mgKOH/g.

11. An inkjet ink composition, comprising the photocurable composition of claim 1.

12. An active energy ray-curable ink composition, comprising the inkjet ink composition of claim 11.

13. A cured product obtained by photocuring the photocurable composition of claim 1.

14. A cured product obtained by photocuring and then thermocuring the photocurable composition of claim 1.

15. An electronic component, comprising the cured product of claim 13.

16. An electronic component, comprising the cured product of claim 14.

* * * * *